(12) United States Patent
Okamoto

(10) Patent No.: US 7,857,084 B2
(45) Date of Patent: Dec. 28, 2010

(54) FRONT FENDER OF MOTORCYCLE AND MOTORCYCLE

(75) Inventor: Hideko Okamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 69 days.

(21) Appl. No.: 12/335,966

(22) Filed: Dec. 16, 2008

(65) Prior Publication Data

US 2009/0166120 A1    Jul. 2, 2009

(30) Foreign Application Priority Data

Dec. 28, 2007    (JP)    ............................... 2007-341402

(51) Int. Cl.
 B62D 61/02    (2006.01)
(52) U.S. Cl. .................... 180/229; 180/219; 280/288.4; 280/152.1
(58) Field of Classification Search ................. 180/229, 180/68.1, 219; 280/288.4, 847, 853, 159, 280/160, 152.1, 274, 276
See application file for complete search history.

(56) References Cited

U.S. PATENT DOCUMENTS

| | | | | |
|---|---|---|---|---|
| 6,733,089 B1 * | 5/2004 | Wakabayashi et al. | ..... 303/9.64 |
| 7,055,655 B2 * | 6/2006 | Takizawa et al. | ......... 188/24.19 |
| 7,066,556 B2 * | 6/2006 | Irie | ............................. 301/6.9 |
| 7,484,600 B2 * | 2/2009 | Watarai | ....................... 188/26 |
| 2003/0188931 A1 * | 10/2003 | LaBrash et al. | ................ 188/26 |
| 2005/0242545 A1 * | 11/2005 | Czysz | ......................... 280/276 |
| 2006/0138744 A1 * | 6/2006 | Namazue et al. | ............ 280/276 |
| 2008/0179125 A1 * | 7/2008 | Glover | ........................ 180/227 |
| 2008/0245632 A1 * | 10/2008 | Watarai et al. | ............... 188/344 |
| 2010/0071985 A1 * | 3/2010 | Harada | ........................ 180/219 |

FOREIGN PATENT DOCUMENTS

JP    2004-338467    12/2004

* cited by examiner

*Primary Examiner*—Lesley Morris
*Assistant Examiner*—Tashiana Adams
(74) *Attorney, Agent, or Firm*—Keating & Bennett, LLP

(57) ABSTRACT

A front fender that increases the cooling effect of an apparatus disposed rearward of a front wheel of a motorcycle. The front fender is disposed above the front wheel and between left and right front suspensions supporting the front wheel. An upper surface part of the front fender extends rearward along an external shape of the front wheel. A transitional part on the upper surface part is formed forward of the front suspensions. An extending direction of the upper surface part changes at the transitional part to direct airflow flowing along the upper surface part away from the upper surface part.

14 Claims, 13 Drawing Sheets

FRONT FENDER OF MOTORCYCLE AND MOTORCYCLE

RELATED APPLICATIONS

This application claims the benefit of priority under 35 USC 119 of Japanese patent application no. 2007-341402, filed on Dec. 28, 2007, which is hereby incorporated by reference.

BACKGROUND OF THE INVENTION

1. Field of the Invention

The present invention relates to a front fender of a motorcycle and, in particular, relates to enhancement of the cooling efficiency of an apparatus disposed in the rear of the front fender.

2. Description of Related Art

An apparatus, such as an engine and a radiator, disposed in the rear of a front wheel of a motorcycle, is cooled by airflow generated while the motorcycle is running. In JP-A-2004-338467, a wall part standing upward is formed on an upper surface of a front fender covering a front wheel of a vehicle. The wall part changes a direction of airflow about to flow downward along the upper surface of the front fender into an engine side to increase the cooling effect of the engine.

However, the wall part of the front fender of JP-A-2004-338467 is located more rearward than front suspensions provided at left and right sides of the front fender. Therefore, because the airflow reaches the front suspensions before reaching the wall part of the front fender, the flow is disturbed and a sufficient cooling effect may not be obtained. That is, the airflow reaches the wall part as a turbulent flow and smooth airflow from the wall part to the engine side is not formed. Thus, a sufficient cooling effect may not be obtained.

SUMMARY OF THE INVENTION

The present invention addresses this problem and provides a front fender that increases the cooling effect of an apparatus such as an engine and a radiator disposed in the rear of a front wheel of a motorcycle.

A front fender of a motorcycle according to the present invention has an upper surface extending rearward along an external shape of a front wheel. The front fender is disposed above the front wheel between a pair of left and right front suspensions supporting the front wheel. A transitional part, in which an extending direction of the upper surface changes, is formed forward of the front suspensions on the upper surface of the front fender to direct airflow flowing along the upper surface away from the upper surface.

A motorcycle according to the present invention is provided with the front fender described above.

According to the present invention, airflow reaches the transitional part before turbulent flow is generated in the airflow, and the airflow is smoothly directed away from the upper surface of the front fender. Moreover, the airflow passes between the left and right front suspensions to flow rearward. Therefore, air efficiently flows to a side of an apparatus disposed rearward of the front wheel, and the cooling effect of the apparatus is increased.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
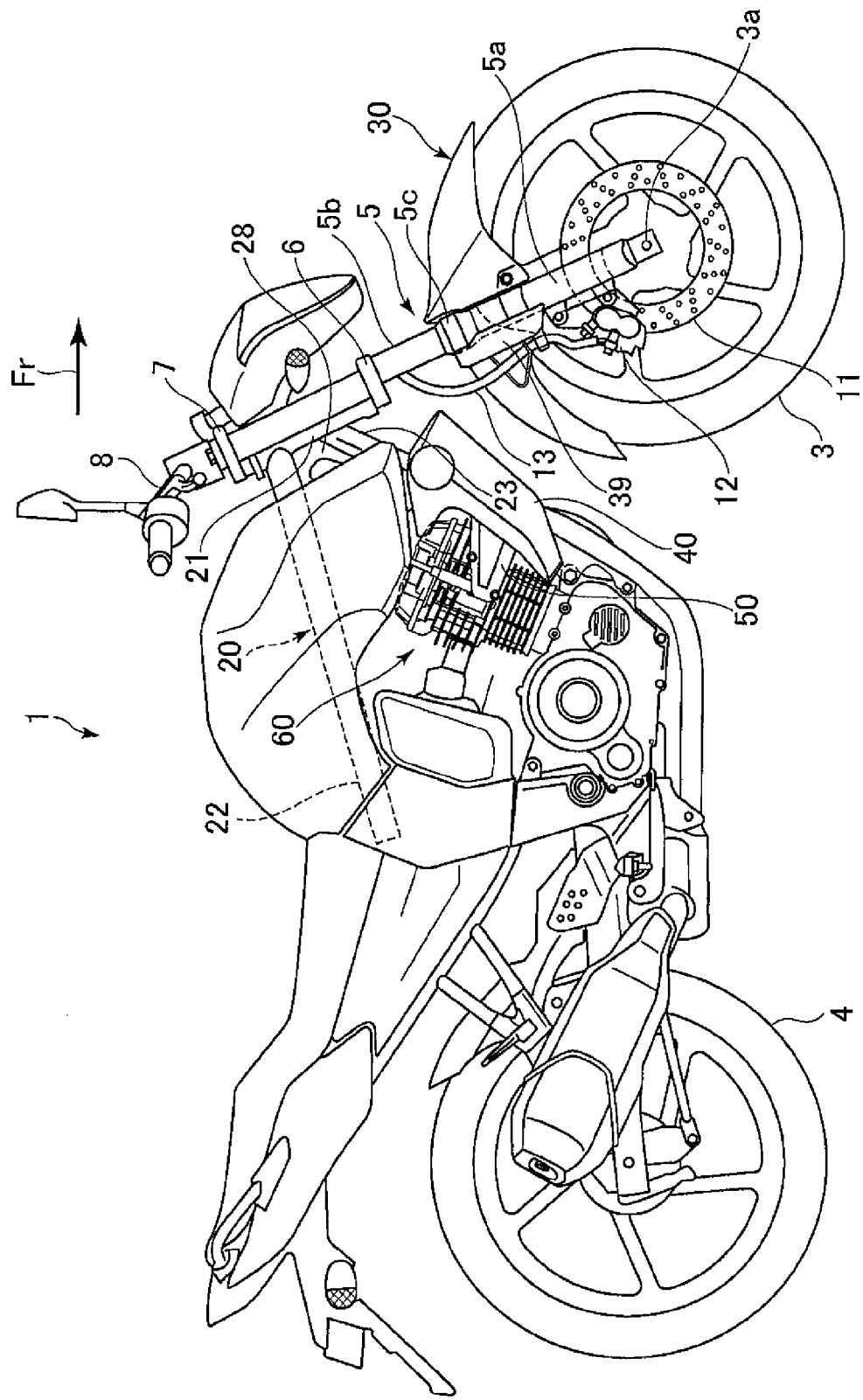
FIG. 1 is a side view of a motorcycle provided with a front fender according to an embodiment of the present invention.
Figure 2:
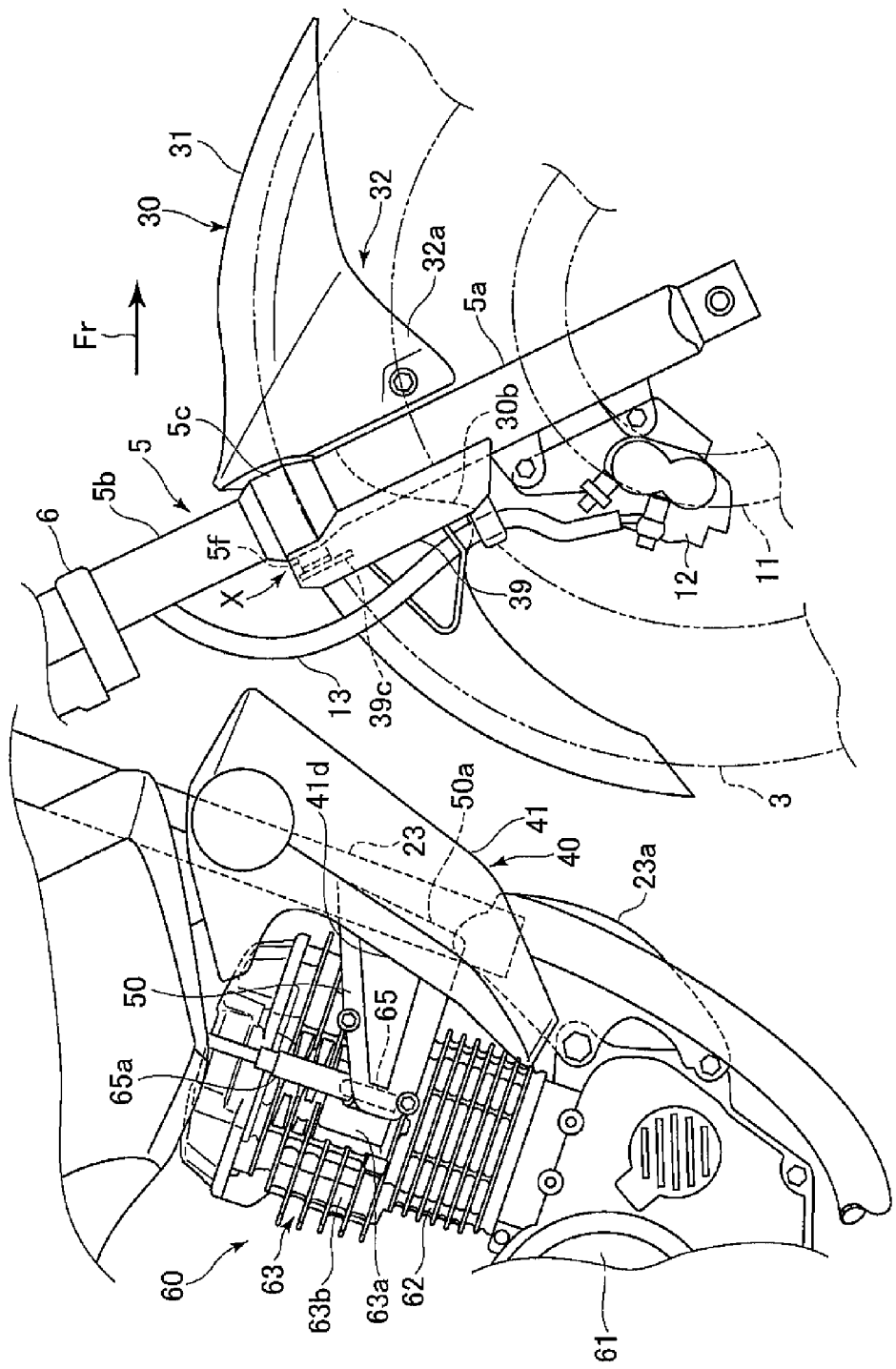
FIG. 2 is a side view of a front part of the motorcycle.

An embodiment of the present invention is now described with reference to accompanying drawings. FIG. 1 is a side view of a motorcycle 1 provided with a front fender 30 as an example of an embodiment of the present invention. FIG. 2 is a side view of a front part of motorcycle 1.

As shown in FIG. 1, in addition to front fender 30, motorcycle 1 includes a front wheel 3, a rear wheel 4, a pair of left and right front suspensions 5, a body frame 20, a regulating plate 39, a shroud 40, a guide wall 50 and an engine 60. Body frame 20 includes a head pipe 21, a main tube 22 and a down tube 23.

Head pipe 21 is disposed at a front end of body frame 20. A front end of main tube 22 and an upper end of down tube 23 are connected to head pipe 21. Main tube 22 extends rearward from its front end. Engine 60 is disposed below and supported by main tube 22.

Engine 60 is an air-cooled type engine cooled by airflow from the front direction of motorcycle 1 while motorcycle 1 is running. As shown in FIG. 2, engine 60 includes a crankcase 61 located in a lower part of engine 60 and housing a crankshaft, a cylinder block 62 extending obliquely upward from crankcase 61 and having a cylinder therein, and a cylinder head 63 mounted in an upper part of cylinder block 62 and having a combustion chamber formed therein for combustion of fuel. Cylinder block 62 and cylinder head 63 are located rearward of front wheel 3 and front fender 30 and lower than an under bracket 6 mounted on front suspensions 5. A plug mount section 63a is formed on and recessed inward from a side surface 63b of cylinder head 63. A spark plug 65 is mounted on plug mount section 63a. A plug cap 65a is attached on spark plug 65.

Engine 60 may also be an engine of a water-cooled type. In this case, a radiator is disposed in front of cylinder block 62 and cylinder head 63, and coolant for cooling engine 60 circulates in the radiator and engine 60. The coolant is cooled by airflow generated while the vehicle is running before flowing in the radiator.

Down tube 23 extends obliquely downward in front of engine 60 from head pipe 21. A bracket 23a provided on the lower end of down tube 23 supports crankcase 61.

Rear wheel 4 is disposed rearward of engine 60. Drive force output from engine 60 is transmitted to rear wheel 4 via a chain, a belt, and so forth.

Head pipe 21 supports a steering shaft disposed therein. The upper and lower ends of the steering shaft are fixed on an upper bracket 7 and under bracket 6 arranged vertically. An axle 3a of front wheel 3 is supported by the lower ends of front suspensions 5. Upper parts of front suspensions 5 are held by both ends of upper bracket 7 and under bracket 6. A handlebar 8 is mounted on upper bracket 7 and rotates leftward and rightward with front suspensions 5 and front wheel 3 around the steering shaft as the center.

Front suspension 5 is, for example, a suspension of a telescopic type and has an inner tube 5b inserted from an upper direction into the inside of an outer tube 5a and vertically swingable relatively in relation to outer tube 5a. Another part of outer tube 5a and a large diameter part 5c whose diameter is larger than that of inner tube 5b are provided on the upper end of outer tube 5a.

Figure 3:
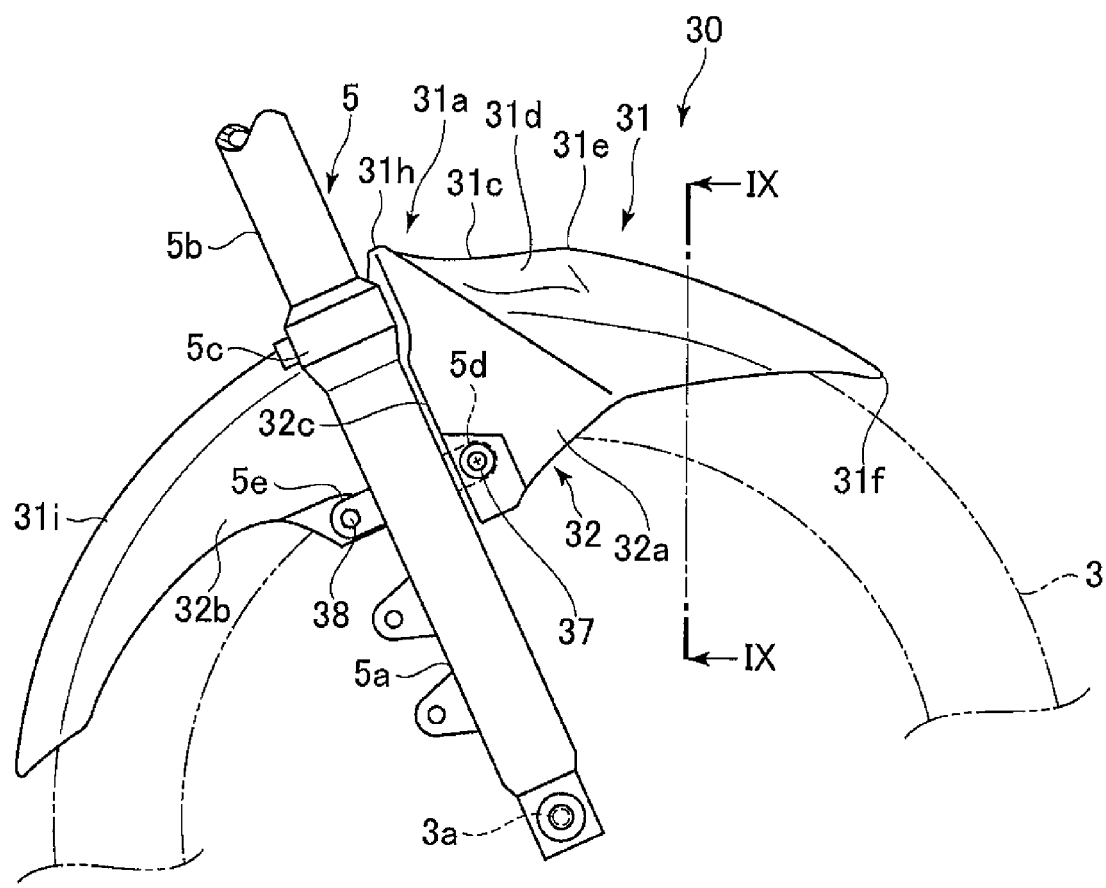
FIG. 3 is a side view of the front fender mounted on a vehicle body.
Figure 4:
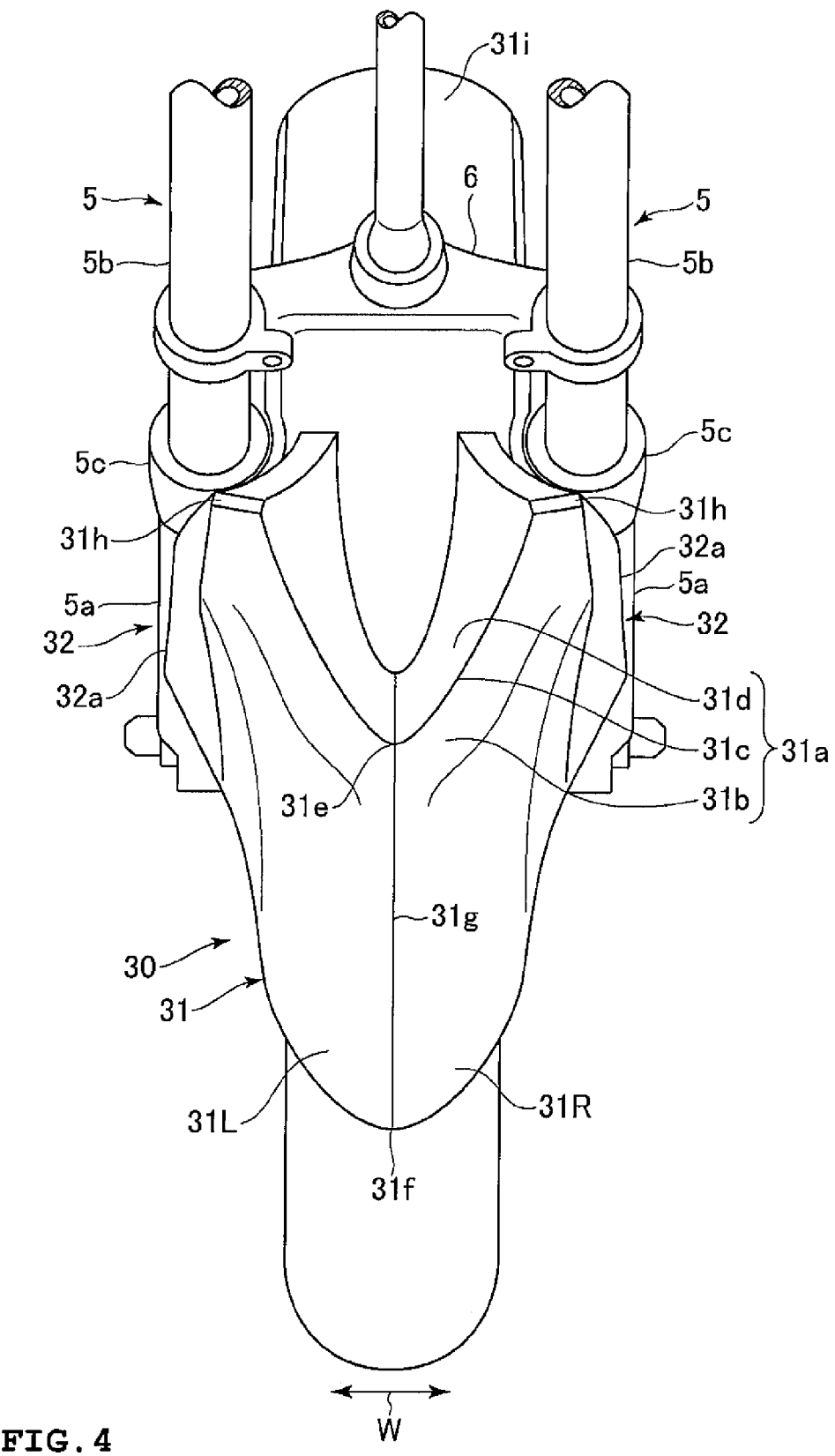
FIG. 4 is a side view of the front fender.
Figure 5:
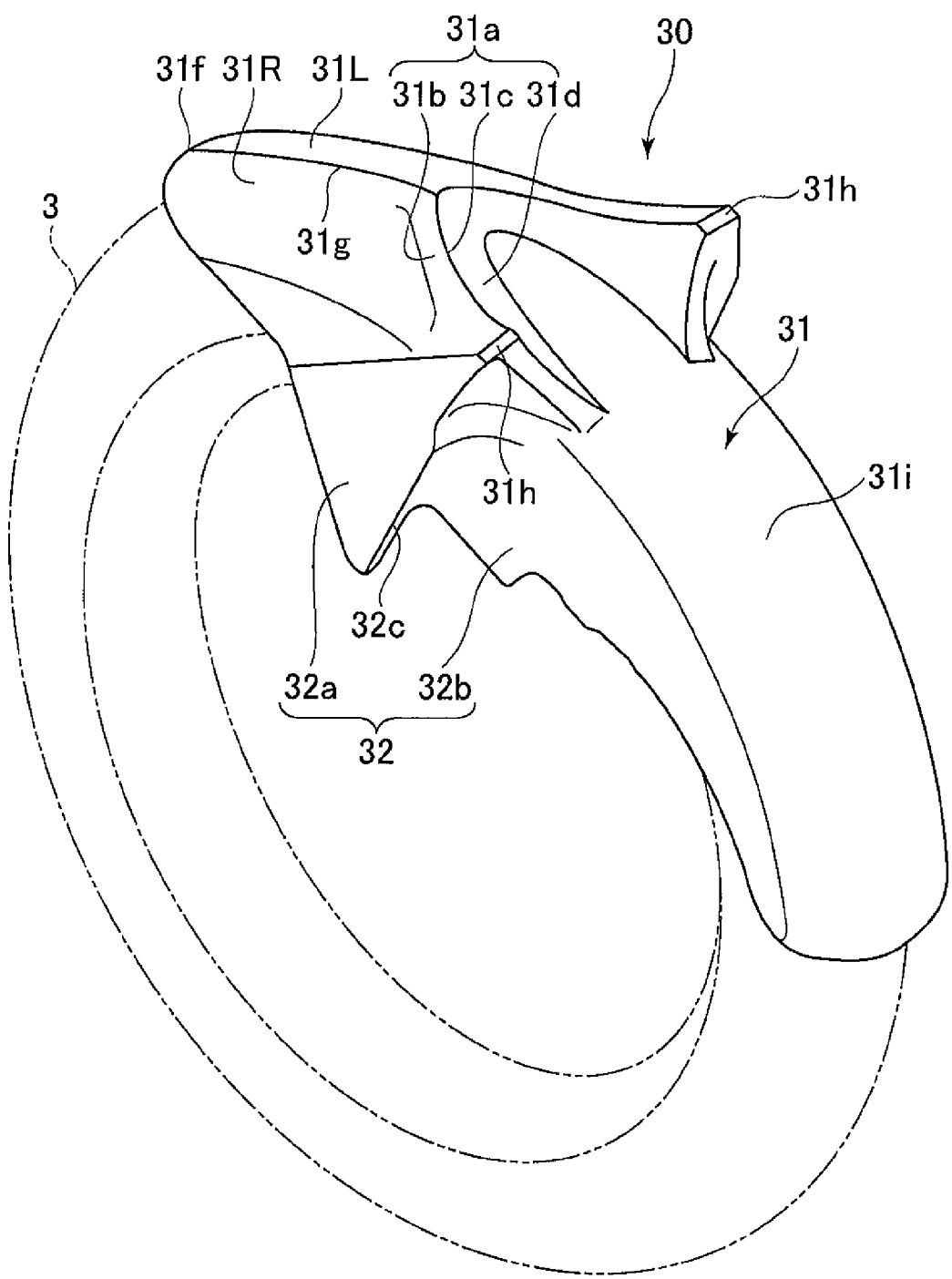
FIG. 5 is a perspective view of the front fender.
Figure 6:
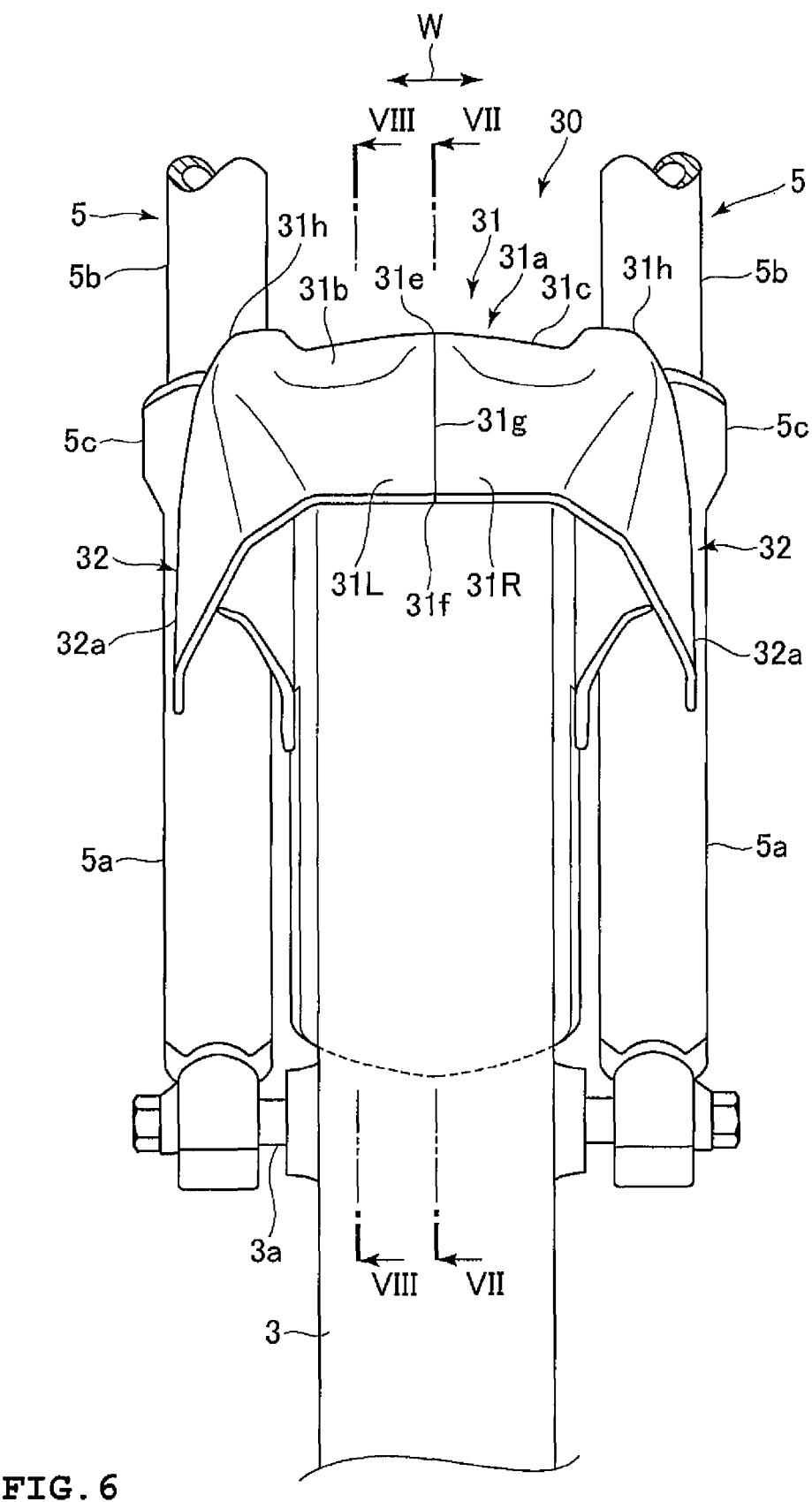
FIG. 6 is a front view of the front fender.
Figure 7:
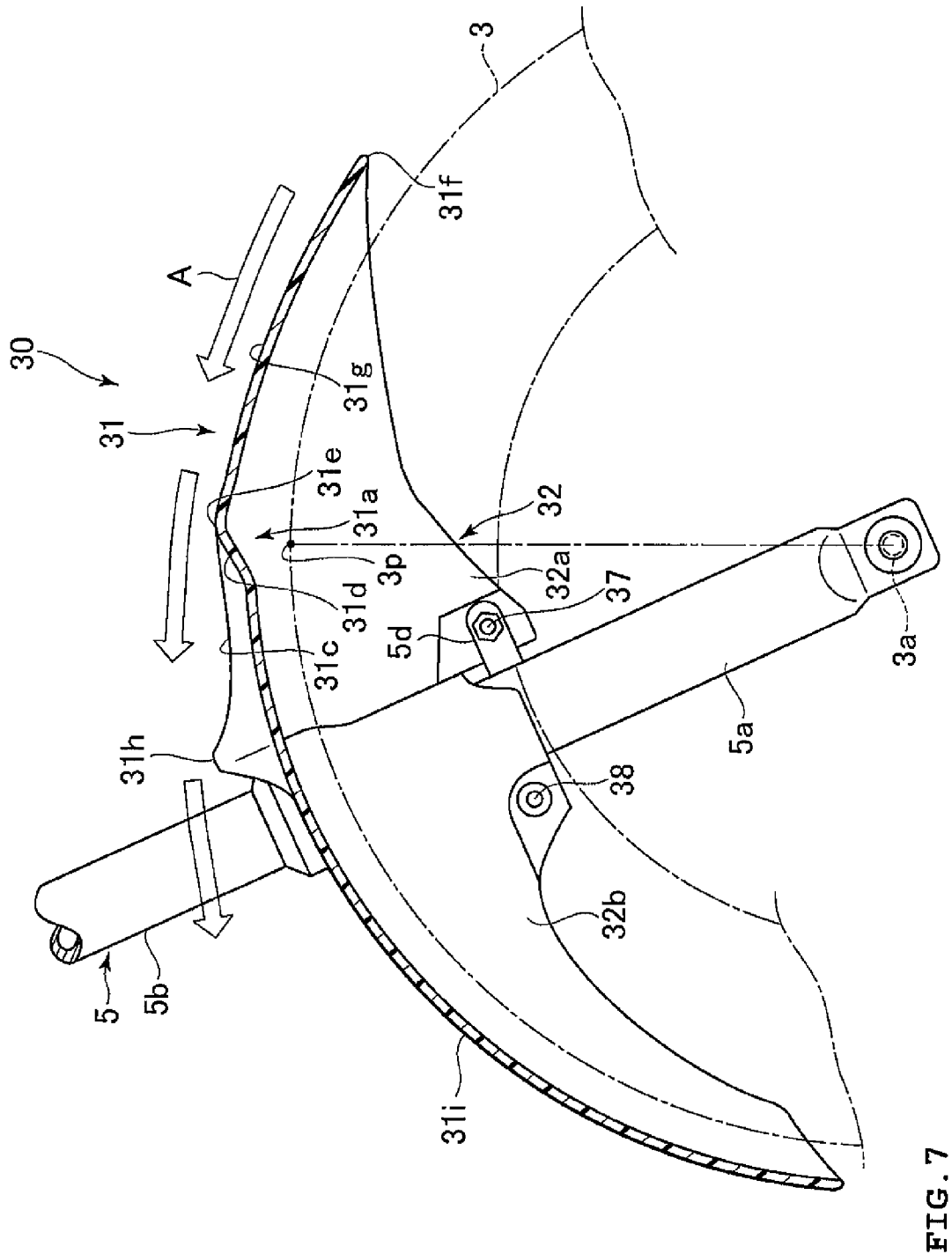
FIG. 7 is a cross-sectional view of the front fender taken along line VII-VII of FIG. 6.
Figure 8:
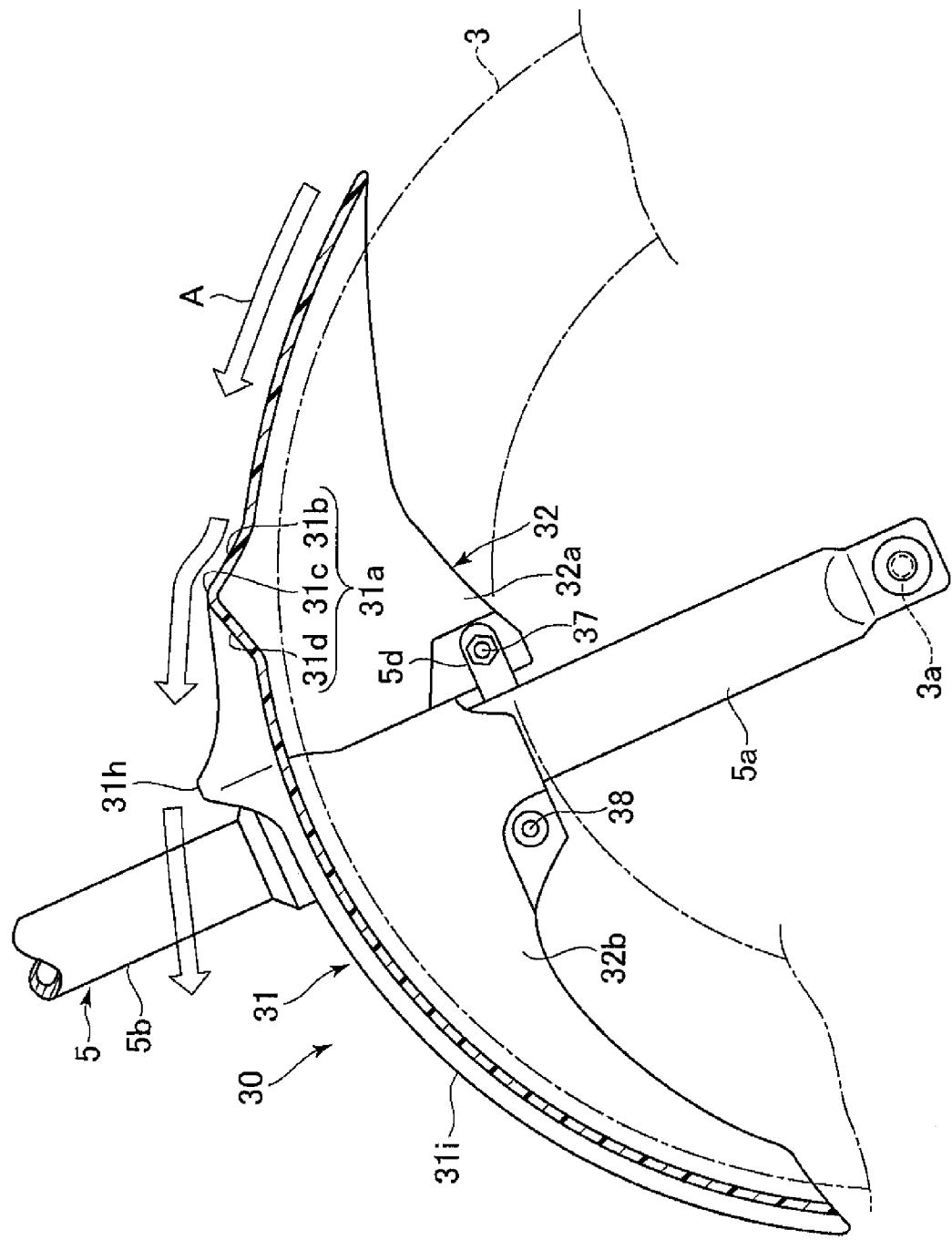
FIG. 8 is a cross-sectional view of the front fender taken along line VIII-VIII of FIG. 6.
Figure 9:
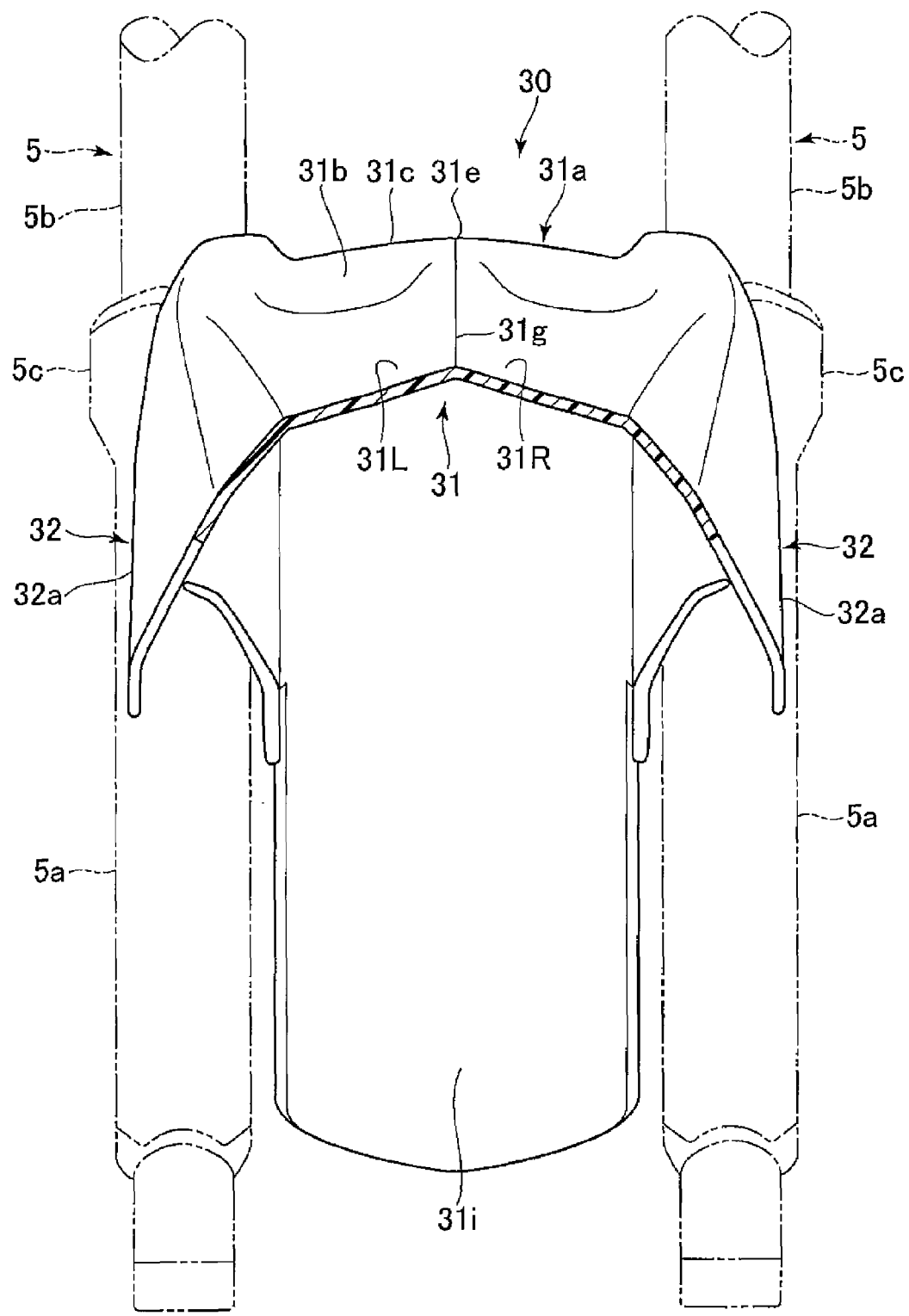
FIG. 9 is a cross-sectional view of the front fender taken along line IX-IX of FIG. 3.
Figure 10:
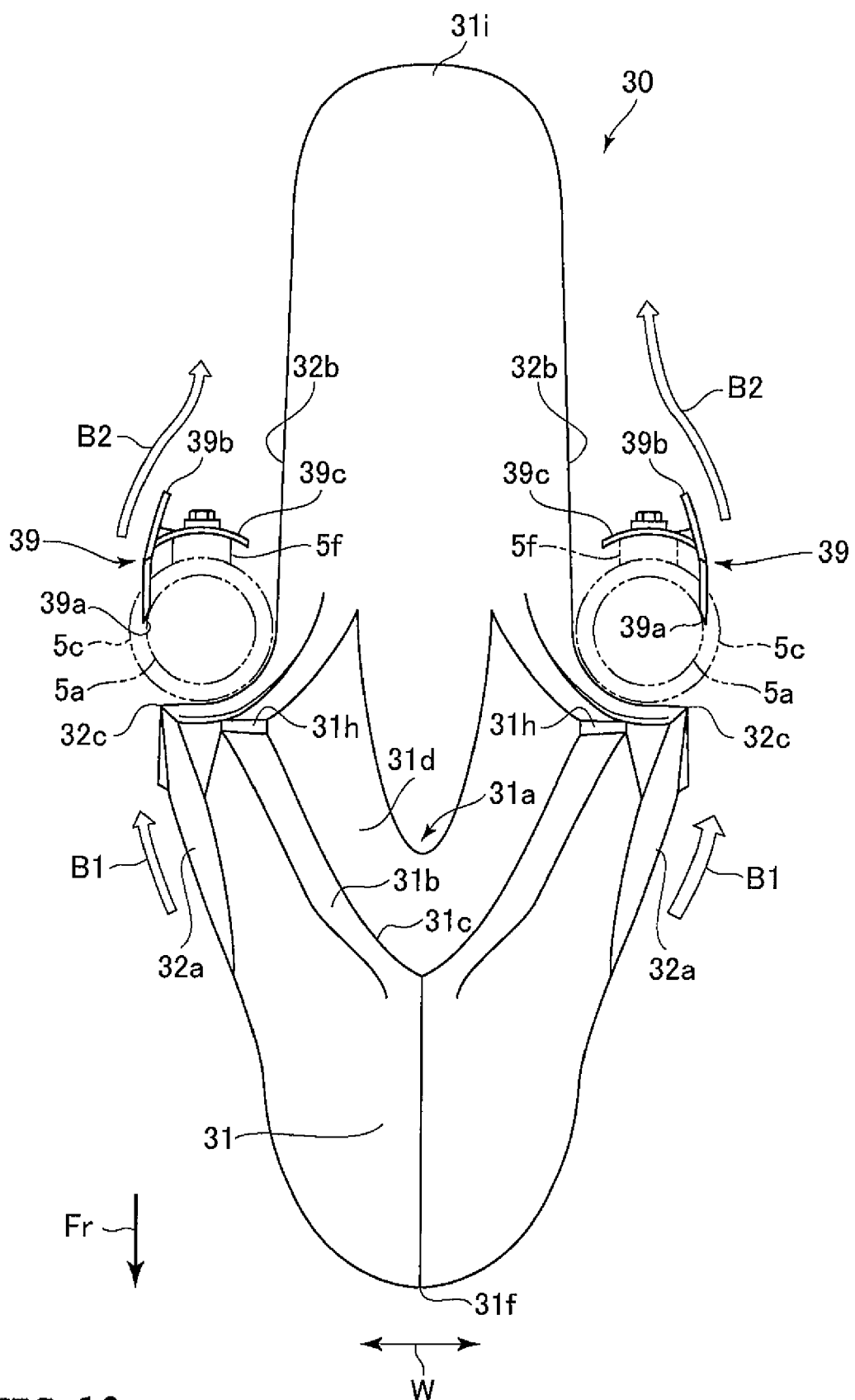
FIG. 10 is a perspective view of the front fender as seen from a direction indicated by arrow X of FIG. 2.

Front fender 30 is now described in detail. FIG. 3 is a side view of front fender 30. FIG. 4 is a plan view of front fender 30. FIG. 5 is a perspective view of front fender 30. FIG. 6 is a front view of front fender 30. FIG. 7 is a cross-sectional view of front fender 30 taken along line VII-VII of FIG. 6. FIG. 8 is a cross-sectional view of front fender 30 taken along line VIII-VIII of FIG. 6. FIG. 9 is a cross-sectional view of front fender 30 taken along line IX-IX of FIG. 3. FIG. 10 is a perspective view of front fender 30 from a direction of arrow X of FIG. 2. Airflow passing above front fender 30 is indicated by arrows in FIG. 7, 8 or 10.

As shown in FIG. 3 or 4, front fender 30 is disposed above front wheel 3 and between left and right front suspensions 5. Front fender 30 bends along the external shape of front wheel 3 and covers front wheel 3 from above.

As shown in FIG. 3, front fender 30 is supported by front suspensions 5. Specifically, the outer circumference of outer tube 5a is provided with a bracket 5d projecting forward inside front fender 30 and a bracket 5e projecting rearward outside front fender 30. Front fender 30 is fixed on brackets 5d, 5e with bolts 37, 38.

Front fender 30 has an upper surface part 31 located in the radial direction of front wheel 3 and a pair of left and right side surface parts 32 extending downward from upper surface part 31 and located on sides of front wheel 3 (see FIG. 5). Upper surface part 31 extends rearward along the external shape of front wheel 3 (see FIG. 7 or 8). Specifically, upper surface part 31 extends generally rearward along the external shape of front wheel 3 in front of front suspension 5 and extends obliquely downward along the external shape of front wheel 3 rearward of front suspension 5.

A transitional part 31a is formed on upper surface part 31 in a position in front of front suspensions 5 (see FIG. 5 or 8). An extending direction of upper surface part 31 changes at transitional part 31a to direct airflow flowing along upper surface part 31 away from upper surface part 31.

Specifically, as shown in FIG. 5 or 8, transitional part 31a includes a front side sloping surface 31b, a bending part 31c adjacent to front side sloping surface 31b, and a rear side sloping surface 31d adjacent to bending part 31c. Upper surface part 31 bends downward (toward the outer circumference side of front wheel 3) at bending part 31c to direct airflow flowing along upper surface part 31 away from upper surface part 31. This means that airflow flows along upper surface part 31 rearward from a front end 31f thereof while the vehicle is running (see FIG. 7). Upper surface part 31 bends at bending part 31c in a direction away from the traveling direction of airflow (the direction indicated by arrow A in FIG. 7 or 8). Consequently, airflow does not follow the change in the extending direction of upper surface part 31 but flows away at bending part 31c from upper surface part 31 and passes between front suspensions 5 and shroud 40 and reaches engine 60. Bending part 31c is located forward of front suspensions 5, and smooth airflow reaches bending part 31c before reaching front suspensions 5. Since the airflow flows away at bending part 31c from upper surface part 31, smooth airflow passing between front suspensions 5 and shroud 40 is formed.

As shown in FIG. 4 or 8, front side sloping surface 31b is located in front of bending part 31c and inclines upward toward bending part 31c. Upper surface part 31 extends rearward from front end 31f thereof and continues to front side sloping surface 31b. Upper surface part 31 inclines obliquely upward at front side sloping surface 31b and reaches bending part 31c. Since upper surface part 31 extends rearward along the external shape of front wheel 3, upper surface part 31 slightly inclines upward not only between front side sloping surface 31b and bending part 31c but also in a range from front end 31f to bending part 31c (see FIG. 7 or 8).

After upper surface part 31 bends at bending part 31c and slightly extends obliquely downward at rear side sloping surface 31d, upper surface part 31 further extends obliquely rearward at a rear side upper surface part 31i adjacent to rear side sloping surface 31d along the external shape of front wheel 3. As shown in FIG. 7, front side sloping surface 31b is not formed at the center in the width direction of upper surface part 31 (the direction indicated by W in FIG. 6), and upper surface part 31 gradually inclines from front end 31f to bending part 31c along the external shape of front wheel 3.

As shown in FIG. 9, the front side of upper surface part 31 is formed such that the cross section thereof forms the shape of the letter V opening in the lower direction, and upper surface part 31 includes a right upper surface part 31R located at the right side on upper surface part 31 and a left upper surface part 31L located at the left side on upper surface part 31. Right and left upper surface parts 31R and 31L extend rearward respectively and continue to front side sloping surface 31b.

As shown in FIG. 6, a top part 31g is formed on upper surface part 31. Top part 31g passes the center in the width direction of upper surface part 31 and extends rearward from front end 31f to reach a front end 31e of transitional part 31a. As shown in FIG. 9, right upper surface part 31R and left upper surface part 31L extend from top part 31g to the left and right sides. The angle formed by right upper surface part 31R and left upper surface part 31L gradually increases toward front end 31f, and the front end edges of right upper surface part 31R and left upper surface part 31L are linearly continued to each other in a front view (see FIG. 6).

As shown in FIG. 4, transitional part 31a on front fender 30 extends from the center in the width direction of upper surface part 31 to the left and right sides. Transitional part 31a is formed to have the shape of the letter V opened in the rear direction in a plan view of front fender 30, and the center in the width direction of transitional part 31a is located forward of both ends of transitional part 31a.

Specifically, bending part 31c extends obliquely rearward with front side sloping surface 31b from front end 31e located at the center in the width direction thereof toward front suspensions 5. End parts 31h of bending part 31c and front side sloping surface 31b at a part in front of end parts 31h are located in front of front suspensions 5 (see FIG. 6). Front side sloping surface 31b is formed such that bending part 31c inclines upward from the center thereof (front end 31e) toward the left and right sides (see FIG. 5). The height of bending part 31c at end parts 31h is higher than large diameter part 5c of outer tube 5a (see FIG. 3). As shown in FIG. 7, front end 31e of bending part 31c is located in a position in the perpendicular direction of an axle 3a and forward of a top part 3p located in the highest position on front wheel 3.

As shown in FIG. 5, side surface parts 32 include a front side surface part 32a and a rear side surface part 32b. Front side surface part 32a extends downward from right upper surface part 31R and left upper surface part 31L located in front of front fender 30. As shown in FIG. 10, front side surface part 32a extends obliquely rearward toward a position on the outer circumference of outer tube 5a on the outer side in the width direction of the vehicle. That is, front side surface part 32a extends toward outer tubes 5a and gradually spreads toward the rear direction in the width direction of front fender 30. Because of this, when the vehicle is running, smooth airflow B1 is provided toward the rear direction along a front side surface part 30a and reaching the side of outer tube 5a (see FIG. 10). Front side surface part 32a is located at a side of front wheel 3 and in front of front suspension 5, and a rear end 32c thereof extends in front of outer tube 5a in the vertical direction (see FIG. 3).

Rear side surface part 32b bends from rear end 32c to the center side (the inner side) in the width direction of the vehicle and extends rearward to pass between outer tube 5a and front wheel 3 (see FIG. 5 or 10).

Regulating plate 39 is now described. As shown in FIG. 2, regulating plate 39 is a member in the shape of a vertically long board that is provided in the rear direction of outer tube 5a. As shown in FIG. 10, regulating plate 39 inclines from the outer circumference of outer tube 5a to the center side in the width direction of the vehicle, and a rear end edge 39b of regulating plate 39 is located closer to the center side than is a front end edge 39a. Smooth airflow B2 is thereby provided from a side of outer tube 5a toward an obliquely rear direction along regulating plate 39.

As shown in FIG. 10, regulating plate 39 has a mount section 39c in the shape of a board on an inner side thereof. Mount section 39c is fixed, for example, on a boss 5f provided to large diameter part 5c of outer tube 5a. As shown in FIG. 2, a brake hose 13 is disposed rearward of regulating plate 39. Brake hose 13 is connected to a caliper 12 pinching a brake disk 11 rotating with front wheel 3.

Figure 11:
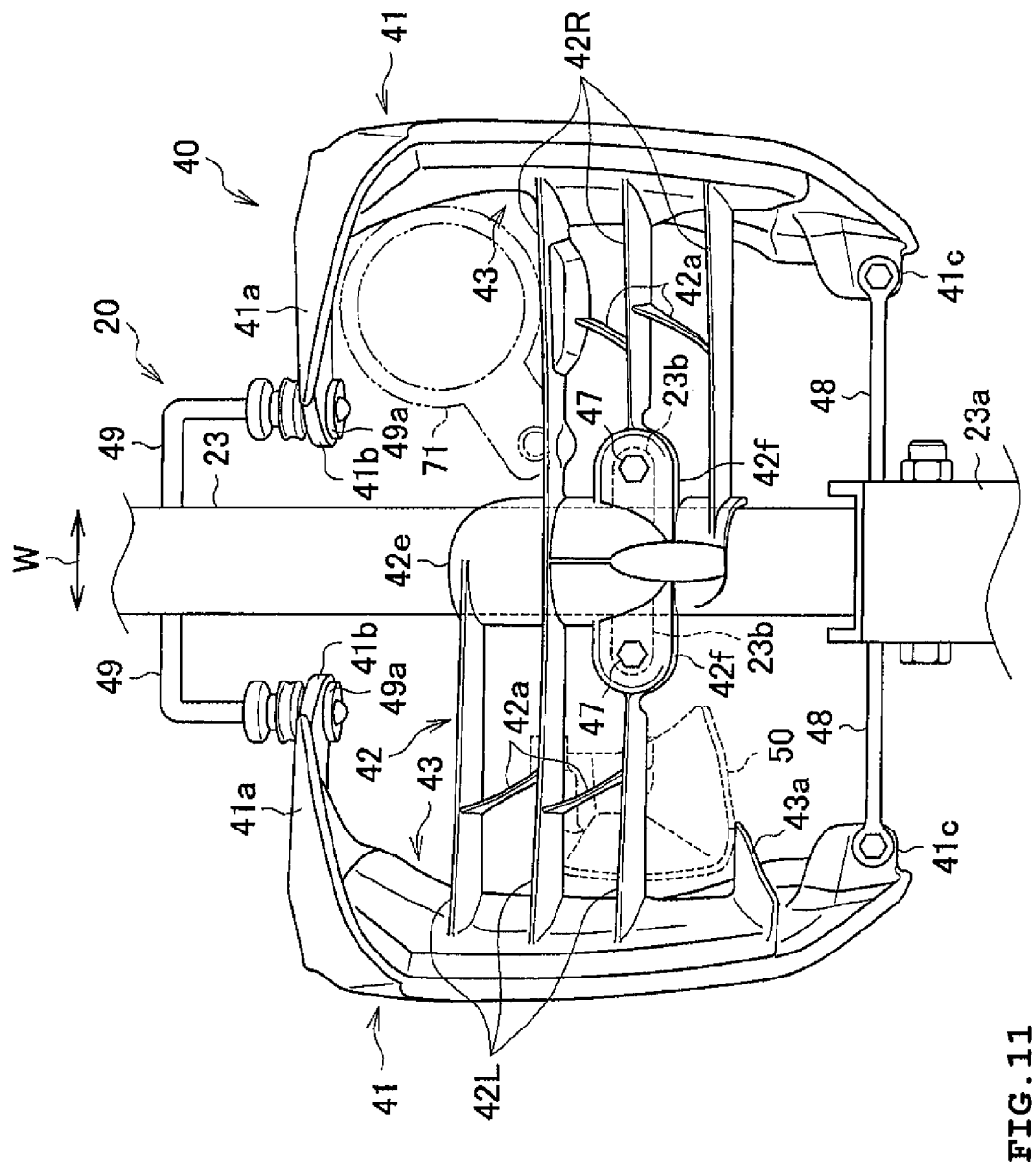
FIG. 11 is a front view of a shroud provided to the motorcycle.
Figure 12:
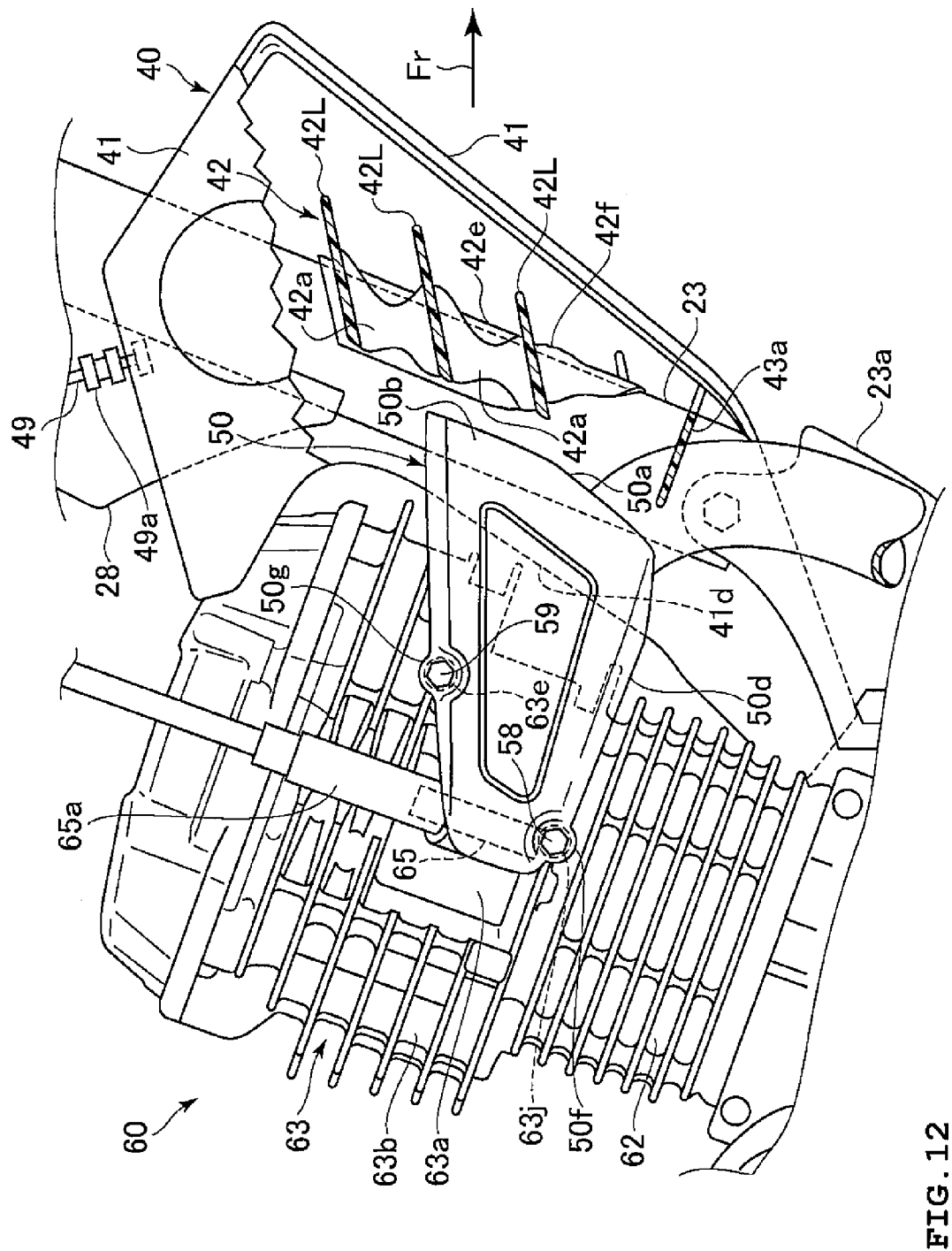
FIG. 12 is a side view of the shroud and a guide wall provided to the motorcycle, in which the outer and inner frames of the shroud are partially broken away.

Shroud 40 is now described. As shown in FIG. 2, shroud 40 is disposed in front of engine 60 and rearward of front fender 30 and directs airflow passing the upper and lateral sides of front fender 30 to engine 60. FIG. 11 is a front view of shroud 40, and FIG. 12 is a side view of shroud 40 and guide wall 50. In FIG. 12, an outer frame 41 and an inner frame 43 of shroud 40 are partially broken, and a front side guide 42 disposed therein is illustrated.

As shown in FIG. 11, shroud 40 has front side guide 42 located in front of cylinder head 63 and cylinder block 62, outer frames 41 in the shape of a board located on the left and right sides of front side guide 42, and inner frames 43 located inside outer frames 41 (on the center side in the width direction of the vehicle) and at the left and right sides of front side guide 42.

Outer frame 41 is located in a position away from the center in the width direction of the vehicle toward a side direction (see FIG. 11). Further, outer frame 41 is located generally at the same height with regulating plate 39 and front side surface part 32a of front fender 30 (see FIG. 2) and directs airflow B1, B2 passing the sides of front side surface part 32a and regulating plate 39 to cylinder head 63 and cylinder block 62.

As shown in FIG. 11, outer frames 41 are supported at the left and right sides of down tube 23 by body frame 20. Specifically, stays 49 extending sideways are provided to body frame 20, and dampers 49a in the shape of a cylinder are provided to the ends of stays 49. Outer frame 41 has an upper surface part 41a above front side guide 42 extending to the side of down tube 23, and a mount section 41b holding damper 49a is formed on the end of upper surface part 41a. A gusset 28 is provided between the upper end of down tube 23 and main tube 22 (see FIG. 1), and stay 49 is mounted on gusset 28. Further, stays 48 extending sideways are mounted on bracket 23a provided to the lower end of down tube 23. A mount section 41c projecting to the side of down tube 23 is formed on the lower edge of outer frame 41, and the end of stay 48 is fixed on mount section 41c.

Front side guide 42 has a plurality of horizontal boards 42L and 42R disposed generally horizontally between down tube 23 and outer frame 41. A plurality of horizontal boards 42L (three in this example) is vertically arranged at the left side of down tube 23, and a plurality of horizontal boards 42R (three in this example) is vertically arranged at the right side of down tube 23. A plurality of horizontal boards 42L and 42R directs airflow A having passed over upper surface part 31 to the side of engine 60. Props 42a supporting horizontal boards 42L, 42R are provided between horizontal boards 42L and between horizontal boards 42R.

Front side guide 42 has a support part 42e on the center thereof vertically extending along the outer circumference of down tube 23 and bending according to the shape of the outer circumference, and a mount section 42f projecting sideways is formed on support part 42e. Mount section 42f is fixed on brackets 23b projecting sideways from down tube 23 with a bolt 47. Horizontal boards 42L and 42R extend sideways from support part 42e.

As described above, inner frames 43 are located inside outer frames 41 (on the center side in the width direction of the vehicle) and at the left and right sides of front side guide 42. A guide board 43a is formed on and projects inward from the lower end edge of inner frame 43 at the left side. Inner frames 43 are formed integrally with front side guide 42.

An alarming horn 71 that sounds a warning sound in response to an operation by an operator is disposed on a side of down tube 23. Alarming horn 71 is located to the rear of a space between the highest right horizontal board 42R and upper surface part 41a of outer frame 41, and is exposed to the front direction of the vehicle.

Figure 13:
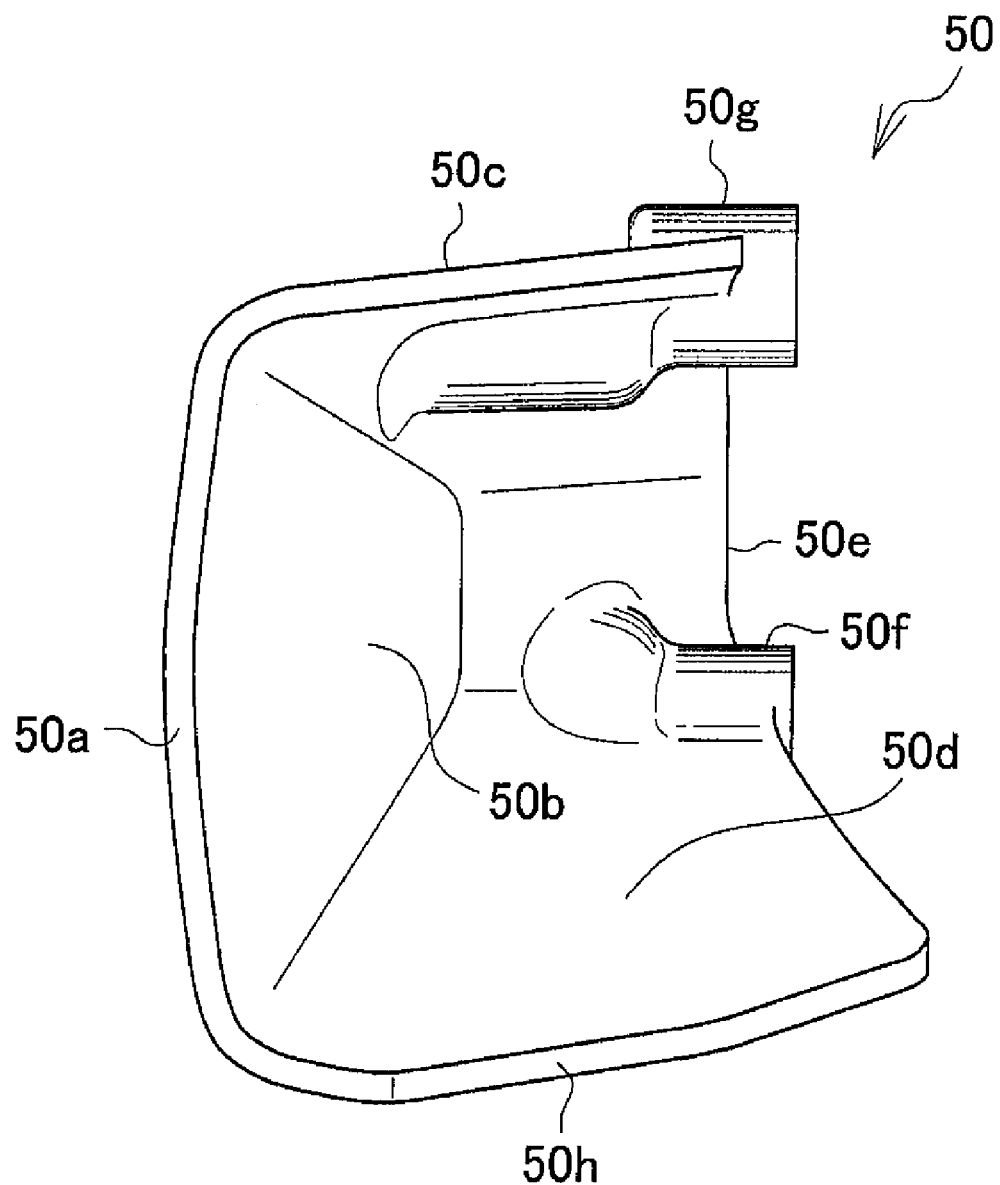
FIG. 13 is a front view of the guide wall.

Guide wall 50 is now described in detail. FIG. 13 is a front view of guide wall 50. Guide wall 50 is provided at a side of cylinder head 63 to direct airflow to plug mount section 63a of cylinder head 63 (see FIG. 2). Guide wall 50 has a side surface part 50b, an upper surface part 50c, and a lower surface part 50d (see FIG. 13). Side surface part 50b extends forward along side surface 63b after projecting sideways from side surface 63b (see FIGS. 12 and 13). Upper surface part 50c and lower surface part 50d extend to the side of side surface 63b from the upper and lower edges of side surface part 50b (see FIG. 13). Because of this, an airflow path surrounded by side surface 63b, side surface part 50b, upper surface part 50c, and lower surface part 50d is formed. A gap is provided between a rear end edge 50e of guide wall 50 and side surface 63b so that air passing the airflow path flows in the rear direction of the vehicle after directed by plug mount section 63a (see FIG. 13).

Guide wall 50 is formed such that a cross section of the airflow path constituted with side surface 63b of engine 60 gradually becomes larger toward the front direction. Specifically, upper surface part 50c inclines in the upper direction in relation to lower surface part 50d so that the distance between upper surface part 50c and lower surface part 50d gradually increases toward the front direction (see FIG. 13). Further, side surface part 50b inclines in relation to side surface 63b of engine 60 such that the front side thereof is located more outward (toward the outside in the width direction of the vehicle) than the rear side thereof.

As shown in FIG. 11 or 12, front side guide 42 of shroud 40 is located in front of guide wall 50. Thus, left horizontal boards 42L are located in front of guide wall 50 and direct airflow to the airflow path constituted by guide wall 50 and side surface 63b.

A front end edge 50a of guide wall 50 is located closer to the center side in the width direction of the vehicle than is outer frame 41 of shroud 40, is located forward of a rear end edge 41d of outer frame 41, and is covered with outer frame 41 from a side (see FIG. 2). As shown in FIG. 12, guide board 43a formed on inner frame 43 is located in front of lower surface part 50d and is provided generally in parallel with lower surface part 50d.

Guide wall 50 is mounted on engine 60. Specifically, as shown in FIG. 12, bosses 63j, 63e projecting sideways are formed in two positions on side surface 63b of cylinder head 63 vertically away from each other. Mount sections 50f, 50g are formed at the end edge of guide wall 50 on the center side in the width direction of the vehicle, and mount sections 50f and 50g are fixed on bosses 63j, 63e with bolts 58, 59.

In the case of front fender 30, transitional part 31a whose extending direction changes is formed on upper surface part 31 at the front side of front suspensions 5 so that airflow flowing along upper surface part 31 flows away from upper surface part 31. According to front fender 30, before turbulent flow is generated, the airflow reaches transitional part 31a and smoothly flows away from upper surface part 31. Moreover, the airflow passes between left and right front suspensions 5 to flow rearward. Accordingly, air efficiently flows to the side of an apparatus disposed rearward of front wheel 3 and the cooling effect of the apparatus is increased.

Further, in the case of front fender 30, transitional part 31a includes bending part 31c at which upper surface part 31 bends downward before extending further rearward along the external shape of front wheel 3. Airflow is thereby directed away from upper surface part 31 at bending part 31c before becoming turbulent.

Further, transitional part 31a has front side sloping surface 31b inclining gradually upward toward bending part 31c in front of bending part 31c. Airflow thereby reaches front side sloping surface 31b, and the flow direction thereof is directed obliquely upward. Consequently, the airflow easily flows away from upper surface part 31 of front fender 30.

Further, upper surface part 31 extends rearward from front end 31f thereof and continues to front side sloping surface 31b. Airflow thereby smoothly flows along upper surface part 31 of front fender 30 and reaches front side sloping surface 31b.

Further, bending part 31c formed on upper surface part 31 extends from the center in the width direction of upper surface part 31 to the left and right sides. Moreover, the center of bending part 31c (front end 31e in the description above) is located in the front direction in relation to end parts 31h thereof. Because the front side of upper surface part 31 is provided along the external shape of front wheel 3, the front side of upper surface part 31 slightly inclines. Consequently, smooth airflow is formed on the front side of upper surface part 31 more easily than on the rear side. Moreover, the center of bending part 31c is located forward of end parts 31h. Consequently, smooth airflow reaches the center side of bending part 31c and efficiently flows away from upper surface part 31 of front fender 30.

Further, bending part 31c extends from the center in the width direction of upper surface part 31 toward left and right front suspensions 5. Airflow is thereby directed away from upper surface part 31 before it reaches front suspensions 5.

Further, bending part 31c inclines gradually upward from the center in the width direction of upper surface part 31 toward the left and right sides. Airflow flowing at the end parts in the width direction of upper surface part 31, in other words, at the sides of end parts 31h, is thereby efficiently directed away from upper surface part 31.

Further, bending part 31c inclines gradually upward from the center in the width direction of upper surface part 31 toward the left and right sides, and end parts 31h thereof are higher than the upper ends of outer tubes 5a (large diameter parts 5c in the description above) provided in the lower part of front suspensions 5. The upper end of the outer tube is normally thicker than other parts of the front suspension. Therefore, turbulent flow is easily generated when airflow reaches the upper end. In the case of front fender 30, end parts 31h of bending part 31c are higher than the upper end of outer tube 5a, and generation of turbulent flow is thereby suppressed.

Further, front fender 30 bends along the external shape of front wheel 3. Moreover, the center (front end 31e) in the width direction of bending part 31c is located forward of the highest position 3p of front wheel 3. Smooth airflow thereby reaches the center side of bending part 31c and is efficiently directed away from the upper surface of the front fender.

Front fender 30 further includes left and right front side surface parts 32a hanging downward and extending rearward toward left and right front suspensions 5. Turbulent flow that is generated when airflow reaches the lower part of front suspensions 5 is thereby suppressed.

Further, top part 31g passing the center in the width direction of upper surface part 31 and extending rearward from front end 31f thereof is formed on upper surface part 31. Air resistance generated by airflow reaching front fender 30 is thereby reduced.

Further, bending part 31c extends from the center in the width direction thereof toward left and right front suspensions 5, and top part 31g extends rearward from front end 31f of upper surface part 31 and reaches the center (front end 31e in the description above) of bending part 31c. While the vehicle is running, air resistance is thereby reduced, and airflow flowing from front end 31f of upper surface part 31 to transitional part 31a is made smooth.

Further, where engine 60 is of an air-cooled type and is disposed rearward of front fender 30, engine 60 is efficiently cooled.

Further, where engine 60 is of a water-cooled type in which coolant cooling the engine flows therein, and a radiator cooling the coolant by airflow is disposed rearward of front fender 30, engine 60 is efficiently cooled.

The present invention is not limited to front fender 30 described above, and various modifications can be made. For example, upper surface part 31 as described herein bulges at transitional part 31a by the fact that front side sloping surface 31b is provided in front of bending part 31c. However, rather than front side sloping surface 31b being formed on upper surface part 31, a step may be formed on upper surface part 31 by bending part 31c.

Further, transitional part 31a as described herein is formed over one end to the other end in the width direction of upper surface part 31. However, transitional part 31a may instead be formed only in a vicinity of the center in the width direction of upper surface part 31.

The invention claimed is:

1. A front fender of a motorcycle, the front fender comprising:
    an upper surface extending rearward along an external shape of a front wheel, the upper surface disposed above the front wheel and between a pair of left and right front suspensions supporting the front wheel; and
    a transitional portion provided on the upper surface and in which an extending direction of the upper surface changes, the transitional portion arranged forward of the left and right front suspensions on the upper surface of the front fender to direct airflow flowing along the upper surface away from the upper surface; wherein
    the transitional portion includes a bending portion at which the upper surface of the front fender bends downward before extending further rearward along the external shape of the front wheel, and the bending portion extends substantially entirely across the upper surface from a left side of the front fender to a right side of the front fender.

2. The front fender according to claim 1, wherein the transitional portion includes a sloping surface in front of the bending portion, the sloping surface inclining upward toward the bending portion.

3. The front fender according to claim 2, wherein the upper surface of the front fender extends rearward from a front end of the front fender to the sloping surface.

4. The front fender according to claim 2, wherein the transitional portion extends from a center in a width direction of the front fender to the left and right sides of the front fender, and the center of the transitional portion is located forward of an end portion of the transitional portion.

5. The front fender according to claim 4, wherein the transitional portion extends from the center in the width direction of the front fender toward the left and right front suspensions.

6. The front fender according to claim 5, wherein the bending portion gradually inclines upward from the center in the width direction of the front fender to the left and right sides of the front fender.

7. The front fender according to claim 6, wherein the bending portion gradually inclines upward from the center in the width direction of the front fender to the left and right sides of the front fender, and an end of the bending portion is higher than an upper end of an outer tube located in a lower portion of the front suspension.

8. The front fender according to claim 4, wherein the front fender bends along the external shape of the front wheel, and the center in the width direction of the transitional portion is located forward of a highest position on the front wheel.

9. The front fender according to claim 1, further comprising:
    left and right side surface portions hanging downward and extending toward the left and right front suspensions from a front side of the front fender.

10. The front fender according to claim 9, wherein a top portion passing a center in a width direction of the front fender and extending rearward from a front end of the front fender is provided on the upper surface of the front fender.

11. The front fender according to claim 10, wherein the transitional portion extends from the center in the width direction of the front fender toward the left and right front suspensions, and the top portion extends rearward from the front end of the front fender to the center of the transitional portion.

12. A motorcycle comprising:
    the front fender according to claim 1.

13. The motorcycle according to claim 12, further comprising:
    an air-cooled engine disposed rearward of the front fender.

14. The motorcycle according to claim 12, further comprising:
    a radiator in which coolant for cooling an engine flows, the radiator being disposed rearward of the front fender such that the coolant is cooled by the airflow flowing along the upper surface of the front fender.

* * * * *